June 1, 1965
S. H. KOHLER ETAL
3,186,454
SHOE FOR PORTABLE POWER-DRIVEN TOOL
Filed Aug. 29, 1962
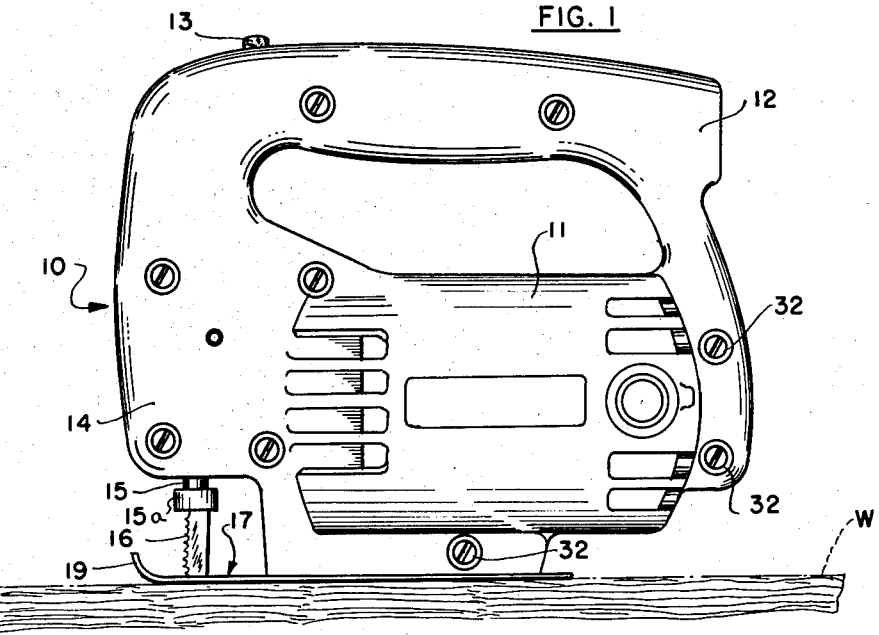
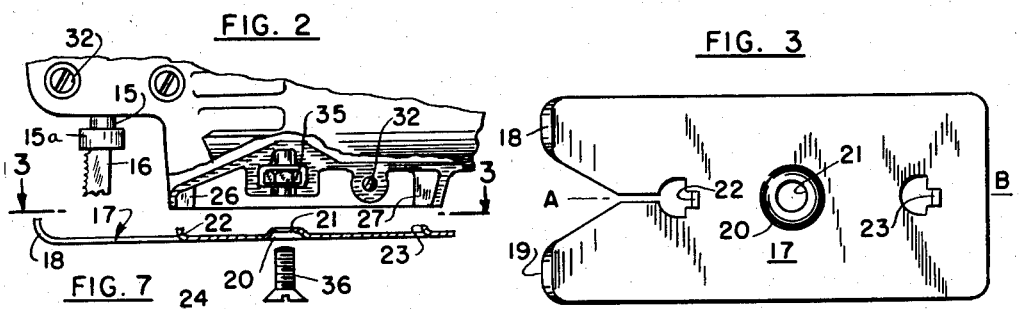
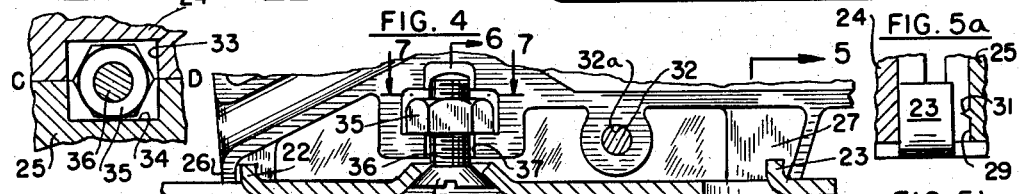
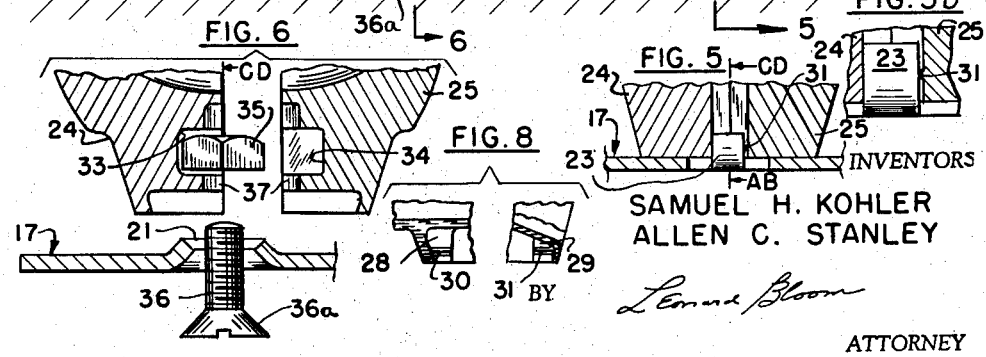
INVENTORS
SAMUEL H. KOHLER
ALLEN C. STANLEY
ATTORNEY

3,186,454
SHOE FOR PORTABLE POWER-DRIVEN TOOL
Samuel H. Kohler, Lutherville, and Allen C. Stanley, Baltimore, Md., assignors to The Black and Decker Manufacturing Company, Towson, Md., a corporation of Maryland
Filed Aug. 29, 1962, Ser. No. 220,303
2 Claims. (Cl. 143—68)

The present invention relates to a shoe structure for a portable power-driven tool, and more particularly, to a substantially-flat shoe plate which is adapted to be secured to a portable electric jig saw, thereby forming a support for the saw and allowing the saw to be moved along the top surface of a work piece.

It is an object of the present invention to provide a shoe for a portable power-driven tool, such as a jig saw, wherein means are provided to position the shoe longitudinally with respect to the tool in combination with means to detachably secure the shoe to the tool, and wherein the detaching means has provisions included therein to automatically compensate for any mis-alignments of the shoe with respect to the housing of the tool.

It is another object of the present invention to provide a shoe structure for a portable electric jig saw, wherein the shoe structure is relatively inexpensive, is assembled to the saw quickly and economically, and forms a stable and durable support for the saw.

In accordance with the teachings of the present invention, a preferred embodiment is illustrated herein, wherein the portable electric jig saw has a split-housing which comprises a pair of complementary mating halves, one of which constitutes the cover for the other. Means are provided to detachably secure these mating halves together along a common longitudinal midplane. A substantially-flat shoe plate is provided which is adapted to rest upon the work surface and to form a support for the split-housing. The shoe plate has a longitudinal center line, which, when the shoe plate is secured to the saw, will coincide approximately with the common longitudinal midplane between the mating halves of the split-housing. A pair of longitudinally-spaced raised tabs are formed on the shoe plate, and the tabs are substantially centered about the longitudinal center line of the shoe plate. Means are then provided to clamp these raised tabs between the mating halves of the split-housing, as the halves are secured together, so that the shoe plate may be positioned longitudinally with respect to the split-housing. Preferably, this means includes two pairs of respective spaced-apart communicating tab recesses, one pair for each of the raised tabs, and internally formed within one of the mating halves of the split-housing. The tab recesses of one of the mating halves of the split housing are provided with longitudinal ridges. Consequently, in the assembly of the shoe plate to the saw, the longitudinal ridges may be pinched against the respective raised tabs, thereby assisting in the longitudinal positioning of the shoe structure with respect to the split-housing. Moreover, a pair of internal bosses having recesses are formed in the split-housing, one in each of the complementary mating halves; these recesses are adapted to communicate with each other when the mating halves are secured together. A clamping nut is mutually disposed in the communicating recesses and is trapped between the mating halves when the halves are secured together. This clamping nut is approximately centered with respect to the common longitudinal midplane, but is allowed to have a limited shifting movement within the mutual recesses in a plane which is substantially parallel to the shoe plate. A screw then passes up through the shoe plate and through the split-housing to engage the clamping nut and to draw the nut against a horizontal ledge at the bottom of the recess. Consequently, the shoe plate is detachably secured to the split-housing; and moreover, any mis-alignment of the shoe plate with respect to the split-housing is automatically compensated for by means of the clamping nut, the latter being adapted to shift slightly within a plane substantially parallel to the shoe plate.

These and other objects of the present invention will become apparent from a reading of the following specification, taken in conjunction with the enclosed drawings in which:

FIGURE 1 is a side elevational view of a typical portable power-driven tool with the shoe plate secured thereto;

FIGURE 2 is an exploded view showing the shoe plate in longitudinal section, and further showing the lower portion of the split-housing for the tool, with parts being broken away and sectioned to illustrate the clamping nut as well as the screw which passes up through the shoe plate;

FIGURE 3 is a top plan view of the substantially-flat shoe plate, taken along the lines 3—3 of FIGURE 3, and showing the longitudinally-spaced raised tabs;

FIGURE 4 is a longitudinal section view showing the shoe plate secured to the split-housing;

FIGURE 5 is a section view taken along the lines 5—5 of FIGURE 4, and showing one of the raised tabs being clamped between the complementary mating halves of the split-housing;

FIGURE 5a is an enlarged view corresponding substantially to a portion of FIGURE 5, but showing in exploded relationship, and in section, one of the longitudinal ridges which is formed on the top half of the split-housing for ultimate engagement with a respective one of the raised tabs;

FIGURE 5b is a view corresponding substantially to that of FIGURE 5a, but showing how the longitudinal ridge is pinched against its respective raised tab when the complementary mating halves of the split-housing are secured together;

FIGURE 6 is an exploded view taken substantially long the lines 6—6 of FIGURE 4 and showing the mating halves of the split-housing, the mutual communicating recesses formed therein for the clamping nut, together with the shoe plate and the fastening screw that engages the clamping nut;

FIGURE 7 is a section view taken along the lines 7—7 of FIGURE 4, showing, in plan view, the clamping nut loosely trapped between the complementary mating halves, and further showing the clearances that allow the clamping nut to shift slightly in a plane which is substantially parallel to the flat shoe plate;

FIGURE 8 is an elevation view, broken for ease of illustration, looking into the top or cover half of the split-housing, and showing the spaced-apart longitudinal ridges which are formed for ultimate engagement with the respective raised tabs formed on the shot plate.

With reference to FIGURE 1, there is illustrated a portable electric jig saw 10 with which the teachings of the present invention may find more particular utility, although it will be appreciated by those skilled in the art that the present invention is equally applicable to a variety of portable power tools and devices. With this in mind, the portable electric jig saw 10 comprises a motor housing 11, an overhead handle 12 which includes an electric switch 13, a gear case 14, a reciprocating shaft or plunger 15 having a suitable clamp 15a for securing a blade 16 to the shaft, and a substantially-flat shoe plate 17 which is detachably secured to the saw 10 in a manner now to be described in detail.

With reference to FIGURES 2 and 3, the shoe plate 17 has a pair of toes 18 and 19 so that the saw 10 may be glided easily along the top surface of the workpiece W. The shoe plate 17 has a depressed center section 20 having a hole 21 formed therein; and moreover, the shoe plate 17 has a pair of lances or raised tabs 22 and 23, or equivalent raised portions, formed thereon. The raised tabs 22 and 23 are longitudinally-spaced with respect to each other and are approximately centered along the longitudinal center line A–B of the shoe plate 17. The tabs 22 and 23 are adapted to be clamped between the complementary mating halves 24 and 25 of the split-housing for the jig saw 10. The mating halves 24, 25 are detachably secured together along a common longitudinal midplane CD, which is commonly referred to as the "parting line" for the housing. The mating half 24, which comprises the "bottom half," has a pair of longitudinally-spaced tab recesses 26 and 27 formed therein, while the other mating half 25, which comprises the "top half" or cover, has a pair of complementary formed tab recesses 28 and 29. Moreover, and as shown more clearly FIGURE 8, each of the recesses 28 and 29 in the mating half 25 has a longitudinal ridge 30 and 31, respectively, formed therein. In a preferred embodiment, these ridges 30, 31 may extend beyond the respective recesses 28, 29 by approximately 1/32 of an inch.

With reference to FIGURES 5, 5a, and 5b, the raised tabs 22 and 23 are adapted to be fitted between the complementary tab recesses 26, 28 and 27, 29, respectively, so as to position the shoe plate 17 longitudinally with respect to the jig saw 10. When the mating halves 24 and 25 are secured together, the longitudinal ridges, such as ridge 31 shown in FIGURES 5a and 5b, will be pinched against the side edge of its respective tab 23, thereby assisting in the longitudinal positioning of the shoe plate 17 with respect to the split-housing of the saw 10; and thereafter, as will be understood, the longitudinal center line AB of the shoe plate 17 will be substantially aligned with the common longitudinal midplane CD between the mating halves 24 and 25.

With reference to FIGURES 1 and 4, the mating halves 24, 25 are detachably secured together by means of a plurality of screws 32, which are adapted to be received within respective threaded holes 32a formed in the lower or bottom half 24.

With reference to FIGURES 2, 4, 6, and 7, a pair of complementary internal bosses having mutual recesses 33 and 34 are formed in the lowermost portion of the mating halves 24 and 25, respectively, and a clamping nut 35 (or other suitable fastening element) is disposed mutually between the recesses 33 and 34 and is trapped therebetween when the mating halves 24 and 25 are secured together. As shown more particularly in FIGURE 7, the clamping nut 35 is approximately centered with respect to the common longitudinal midplane CD, but has a slight clearance with respect to the walls of the recesses 33 and 34, such that the clamping nut 35 may have a limited shifting movement within the recesses 33, 34 and in a plane which is substantially parallel to the shoe plate 17 while being precluded from a substantial rotation therein, it being appreciated that the clearances in FIGURE 4 between the nut 35 and the recesses 33, 34 are deliberately exaggerated to emphasize the loose entrapment of the nut in the cooperating recesses. A clamping screw 36 is then provided. The screw 36 has a head 36a which will be disposed, as shown in FIGURE 4, in the depressed center section 20 of the shoe plate 17. The screw 36 passes up through the hole 21 in the shoe plate 17, and up through a hole 37 formed in the split-housing, to engage the clamping nut 35. The clamping nut 35, which, previous to engagement with screw 36, was laterally shiftable within the confines of the mutual recesses 33 and 34, is now rigidly secured to the screw 36 and no longer shifts, laterally, about the common longitudinal midplane CD, but rather, is drawn up tightly against the horizontal ledge or shelf at the bottom of the mutual recesses 33, 34 to retain the shoe plate 17 to the housing for the tool.

Consequently, the shoe plate 17 is detachably secured to the jig saw 10; and moreover, any misalignment of the shoe plate 17 with respect to the saw 10 will automatically be compensated, or accommodated for, by reason of the clamping nut 35 and its ability to shift, previous to its clamping engagement with the screw 36, within the recesses 33 and 34 in a plane which is substantially parallel to the shoe plate 17.

The combination of the raised tabs 22, 23 and the longitudinal ridges 30, 31 comprise the means for positioning the shoe structure 17 longitudinally with respect to the tool 10; the tabs and ridges cooperate with each other as the mating halves 24, 25 of the split-housing are detachably secured together, such that the longitudinal center line AB of the shoe 17 will fall within, or be aligned with, the common longitudinal midplane CD of the split-housing for the saw 10. Moreover, the combination of the clamping nut 35 and screw 36, and the ability of the clamping nut 35 to shift slightly within the mutual recesses 33, 34 and in a plane which is substantially parallel to the shoe 17, previous to clamping engagement with the screw 36, thus comprise the securing means for detachably securing the shoe 17 to the saw 10; and this securing means automatically accommodates any production misalignment of the shoe 17 with respect to the saw 10.

More specifically, the longitudinal ridges 30 and 31 extend towards the midplane CD (and away from their respective recesses 28 and 29 as in FIGURE 5a) by an amount which is substantially equal to the total tolerance "build up" between the width of the tabs 22 and 23, the centering of the tabs with respect to the center line AB of the shoe 17, and the depth of the recesses 26, 27 and 28, 29 in the respective mating halves 24, 25 of the split-housing. Hence, it is assured that the longitudinal ridges 30, 31 of the mating half 25 will always be pinched against the respective tabs 22, 23 in the shoe 17. The longitudinal ridges 30, 31 are formed integrally with the mating half 25, which preferably is of an aluminum die-cast construction, while the tabs 22, 23 are formed integrally with the shoe 17, which preferably is made of sheet steel. Consequently, the relatively-soft ridges 30, 31 are pinched or deformed against the relatively-hard tabs 22, 23, respectively; and thus, it will be appreciated that the ridges 30, 31 in combination with the laterally-shiftable clamping nut 35 serve the joint function of "taking up the tolerances" in the assembly of the shoe 17 to the saw 10.

Obviously, many modifications may be made without departing from the basic spirit of the present invention; and accordingly, within the scope of the appended claims, the invention may be practiced other than has been specifically described.

We claim:
1. In a portable power-driven tool having a split housing comprising a pair of mating halves detachably secured together along a common longitudinal midplane, the improvement in the shoe structure and the means to secure the shoe structure to the housing, which comprises:
 (a) a substantially-flat shoe plate having a pair of spaced-apart lanced-out raised tabs formed along its longitudinal axis;
 (b) a pair of longitudinally-spaced tab recesses formed within each of the mating halves;
 (c) each pair of tab recesses opening to the common longitudinal midplane, and the tab recesses of one half communicating with the tab recesses of the other half of the split housing;
 (d) said respective raised tabs of said shoe plate being trapped in said respective communicating tab recesses, thereby positioning said shoe plate with respect to the tool housing;

(e) a boss formed within each of the mating halves along the longitudinal midplane, each boss being formed intermediately of said respective pair of tab recesses;

(f) each boss having a recess opening to the common longitudinal midplane, with a horizontal ledge at the bottom of the recess, and each boss further having a vertical aperture communicating said recess with the underside of said boss;

(g) said recess, said vertical aperture, and said ledge of the one boss communicating with those of the other boss;

(h) a clamping nut positioned mutually in said communicating recesses of said respective bosses, said clamping nut having a limited shifting movement therein in a plane parallel to said shoe plate, but being precluded from rotating therein; and (i) a screw passing up through said shoe plate and said communicating vertical apertures to engage said clamping nut, thereby drawing said clamping nut against said communicating horizontal ledges, and thereby securing said shoe plate to the housing.

2. The combination of claim 1, wherein said means to trap said raised tabs of said shoe plate in said respective pairs of tab recesses includes:

(a) a longitudinal ridge formed in each of said tab recesses in one of the mating halves, each ridge pinching against a side of a respective raised tab.

References Cited by the Examiner

UNITED STATES PATENTS

| | | |
|---|---|---|
| 894,884 | 8/08 | Hallowell. |
| 2,783,792 | 3/57 | Keesling. |
| 2,841,993 | 7/58 | Kaufmann. |
| 2,902,067 | 9/59 | Oakley. |

FOREIGN PATENTS 872,595   7/61   Great Britain.

OTHER REFERENCES

German application 1,094,968, Scintilla, printed Dec. 15, 1960 (Kl. 38a 7), 1 sheet dwg., 2 pages spec.

WILLIAM W. DYER, JR., *Primary Examiner.*

DONALD R. SCHRAN, *Examiner.*